T. K. LADD.
BROOM CORN TABLING MACHINE.
APPLICATION FILED AUG. 5, 1920.
1,396,331.
Patented Nov. 8, 1921.
3 SHEETS—SHEET 1.
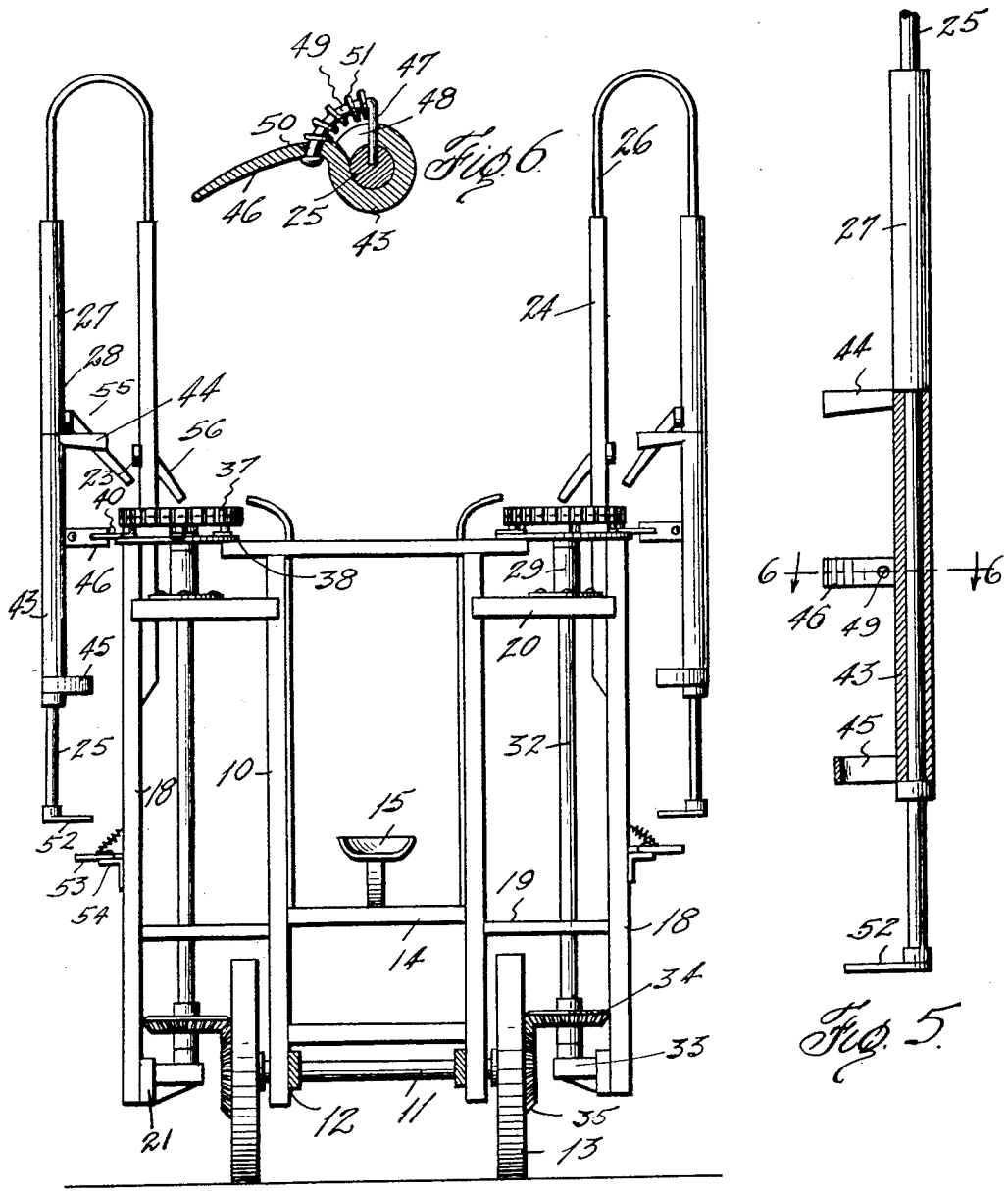

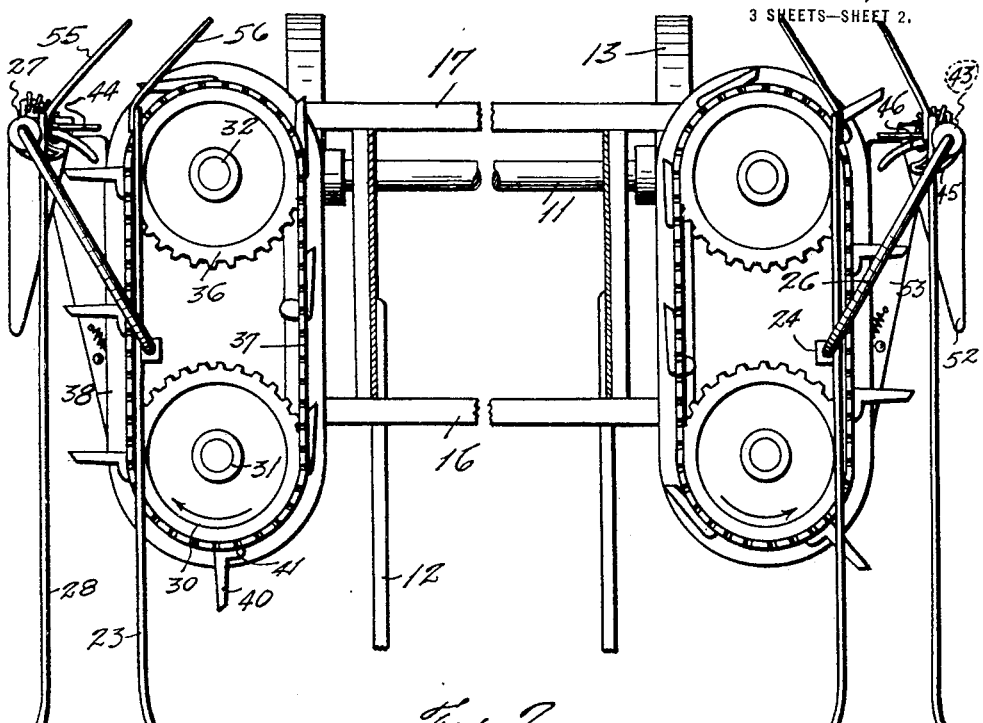
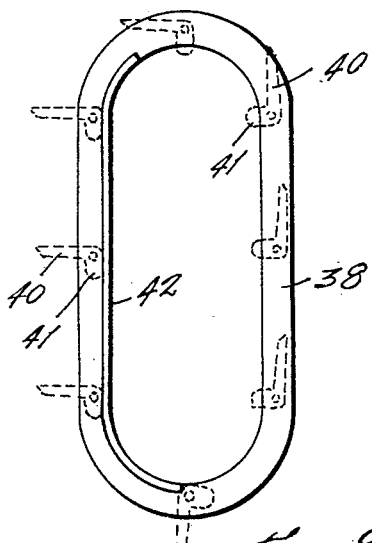
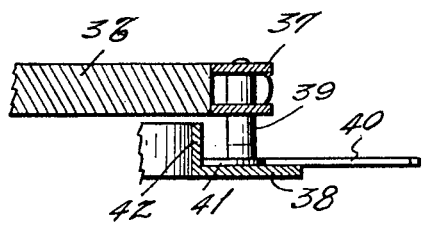

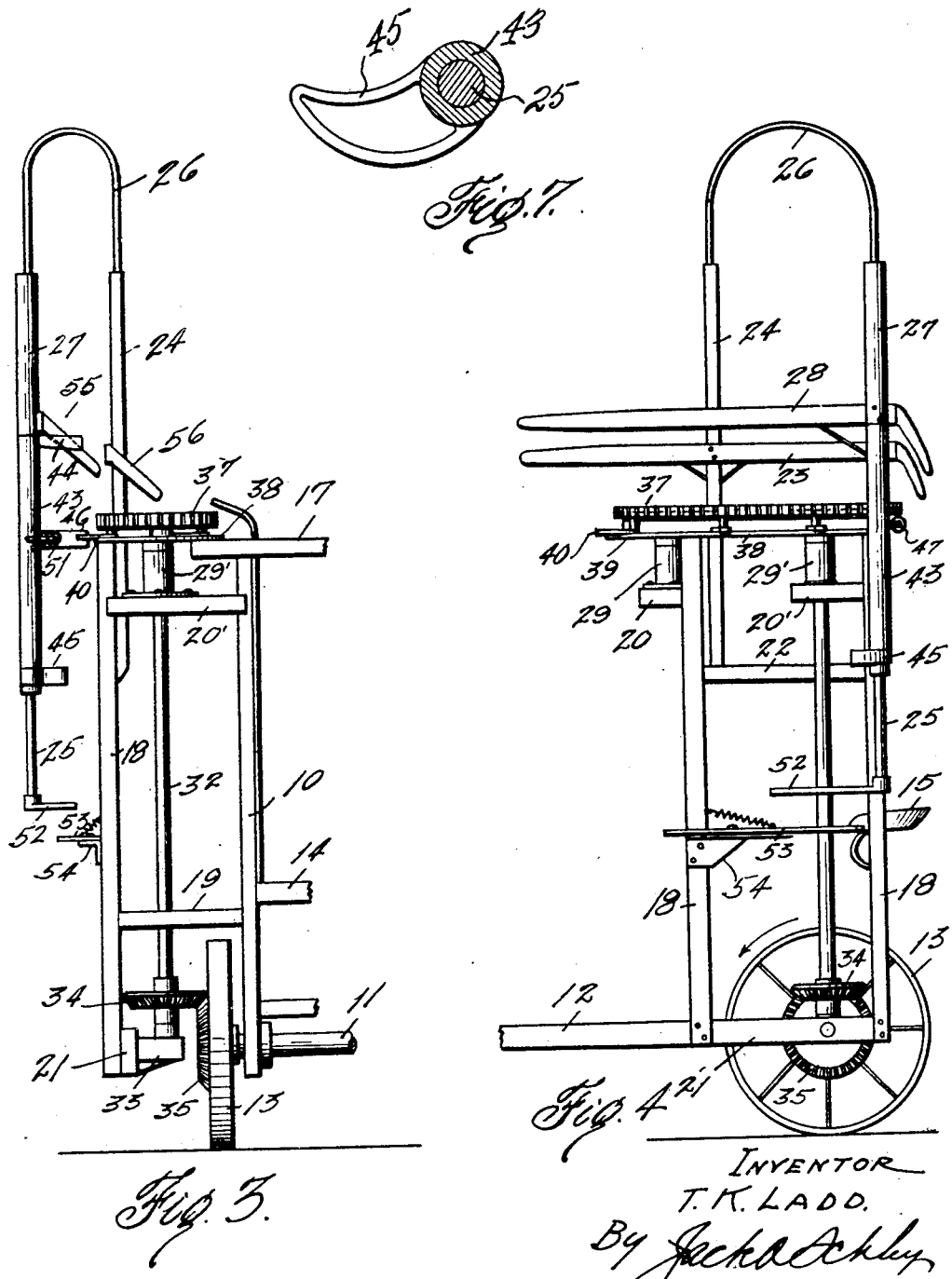

UNITED STATES PATENT OFFICE.

THEODORE K. LADD, OF VALLEY MILLS, TEXAS.

BROOM-CORN-TABLING MACHINE.

1,396,331. Specification of Letters Patent. Patented Nov. 8, 1921.

Application filed August 5, 1920. Serial No. 401,470.

*To all whom it may concern:*

Be it known that I, THEODORE K. LADD, a citizen of the United States, residing at Valley Mills, in the county of Bosque and State of Texas, have invented certain new and useful Improvements in Broom-Corn-Tabling Machines, of which the following is a specification.

This invention relates to new and useful improvements in broom corn tabling machines.

Broom corn is planted in rows and the stalks are close together in each row and grow to a height much above the head of the average man. It is necessary to go along the row and bend the stalks down so that the heads may be cut. The operation which consists in bending the stalks down is called tabling for the reason that the stalks from one row are bent down and over upon the stalks which have been bent down from the next adjacent row. Several devices have been invented for doing this work mechanically, and my invention has to do with certain improvements along this line. The purpose of the invention is to provide a machine which will work on two rows at the same time and will bend the stalks from one row in alternate relation to those of the other row so that one stalk will fall upon the other.

In carrying out the invention I provide an upright frame mounted on a pair of ground wheels and suitably propelled. At each side the frame carries a pair of guide or gathering members which form a throat into which the stalks are received. Endless chains are provided with fingers which travel rearwardly in the throat, but forcing the stalks rearwardly as the machine is moved forwardly. Bending members are provided on the frame and tabling devices are provided at each side. These devices are arranged to swing and force the stalks backward so that they will bend over the bending members and then fall by their own weight. The chains are arranged so that the fingers of one enters the throat in alternate relation to the fingers of the other chain, this will cause a stalk on one side to be dropped or tabled prior to the stalk on the other side so that the latter stalk will fall upon the former. Other details of construction and novel features will be hereinafter more particularly pointed out.

The invention will be more readily understood from a reading of the following specification and by reference to the accompanying drawings, in which an example of the invention is shown, and wherein:

Figure 1 is a front elevation of a machine constructed in accordance with my invention, Fig. 2 is a plan view of the same, Fig. 3 is a rear elevation of one side of the machine, Fig. 4 is a side elevation of the machine, Fig. 5 is a detail of one of the stalk swinging members, Fig. 6 is a cross-sectional detail on the line 6—6 of Fig. 5, Fig. 7 is a detail in plan of the stalk bending arm, Fig. 8 is a plan view of one of the chains and its guide frame, and Fig. 9 is an enlarged sectional detail of one of the chains and portions of one of the sprockets and guide frames.

In the drawings the numeral 10 designates an upright rectangular frame suitably mounted at its lower end on a shaft 11, and provided with a pair of shafts or other draft connections 12. The shaft is mounted in ground wheels 13 on each side of the frame. At the rear of the frame a transverse seat bar 14 is provided and a driver's seat 15 is suitably mounted thereon. The frame at its top has a front cross bar 16 and a rear cross bar 17. Vertical standards 18 are spaced from each side of the frame by bottom bars 19 and a top plate 20 extending from the sides of the frame 10. The standards at each side are connected at their lower ends by a bar 21 and near their upper ends by a bar 22. Each rear standard is connected to the side of the frame 10 by a plate 20'.

Elongated guide fingers 23 are secured to posts 24 projecting upwardly above the frame and standards, each post having its lower end fastened to the bar 22 on its side and being otherwise fastened to its standards. An arch member 26 is fastened to the top of each post 24, and has a vertical rod 25 depending from its outer end and spaced from the standards. A sleeve 27 is fixed on each rod 25 and carries on its inner side a guide finger 28 parallel with the fingers 23. The fingers 23 and 28 have their forward ends directed outwardly and each pair of fingers forms a throat into which the stalks are received. Bearing boxes 29 are mounted on the plate 20 and similar bearing boxes 29' are mounted on the plate 20'. Sprockets 30 are mounted on stub shafts 31 which are supported in the forward boxes 29. Vertical drive shafts 32 extend through the boxes 29' and have their lower ends supported on brackets 33. On each shaft 32 a bevel gear 34 is fastened. The bevel gears 34 are driven by bevel gears 35 fastened on the ground wheels 13.

Sprocket wheels 36 are fastened on the upper end of each shaft 32. From each sprocket 30 an endless chain 37 extends rearwardly and passes around the rear sprocket 36. It will be seen that when the machine is pulled forwardly the sprocket wheels 36 will be revolved and thus transmit motion to the chains on each side, whereby the outer leg of each chain will travel rearwardly. The sprockets are supported above the top bars 16 and 17. An elongated chain guide frame 38 is mounted on each side of the machine. Each frame has its inner sides supported on the bars 16 and 17 and its outer sides carried by the standards 18.

As is best shown in Fig. 9, studs 39 depend from the links of the chain and each stud has pivoted on its lower end a finger 40, each finger having a lug 41 at its inner ends directed at right angles thereto. An upright side flange 42 is provided on each frame 38. This flange extends along the inner ends of the outer side of the frame and curves around each end to the center of the frame. As each chain is traversed the lug 41 engages the front end of the flange 42 whereby the fingers are swung outwardly as indicated in Figs. 2 and 8. When the fingers reach the rear end of the flange 42 they may be swung inward as is shown. By this arrangement the fingers are held transversely of the throats when passing through the same, the lugs 41 being directed forwardly and bearing on the flange 42 so that the stalks cannot push said fingers forwardly and are thus themselves carried rearwardly.

On each rod 25 immediately below the sleeves 27 a tubular hub 43 is mounted. This hub carries a radial finger 44 at its upper end and has an arm 45 at its lower end. Intermediate the ends of each hub a finger 46 is provided and extends into the path of the chain fingers 40. Adjacent each finger 46 a stud 47 projects rearwardly from each rod 25 through an arcuate slot 48 in the hub, said slot extending from the rear side of the finger 46 in each case. A segmental bar 49, concentric to the rod 25 extends forwardly from the end of the stud 47 and passes through an aperture 50 in each finger 46. On each bar 49 a coil spring 51 is confined between the finger 46 and the stud 47.

From this it will be seen that when a hub 43 is swung rearwardly its spring 51 will be compressed so that when it is freed the spring will swing back to its normal position.

On the lower end of each rod 25 an angular bending member 52 is mounted. Below each member 52 an oppositely directed angular bending member 53 is pivoted on a bracket 54 carried by the standards 18. The bending members at each side form a crotch into which the stalk is received, the upper bending members 52 acting to guide the stalks over the lower members 53. The members 53 are pivoted so that after the stalk is bent said member will be swung sufficiently to free the stalk as will be obvious.

In using the machine it is drawn along between two rows, the stalks of which enter between the guide fingers 23 and 28. Motion is imparted to the chain 37 by the shafts 32 from the ground wheels 13. The fingers 40 are arranged so that those of one chain will be positioned in alternate relation to those of the other chain. As the fingers 40 swing into the throat formed by the fingers 23 and 28 the stalks will be pushed rearwardly and held in upright position.

When a stalk comes in contact with the bending members 52 and 53 at one side of the machine, it will also be carried past the arm 45 and at the same time the finger 40 which is pushing the stalk will engage the finger 46 and rotate the hub 43. The arm will swing and engage the stalk and assist in bending the stalks over the bending members. The finger 44 will guide the top of the stalk over toward the frame 10. To assist in directing the stalks arms 55 and 56 are fastened to the rear ends of the fingers 23 and 28 and are directed toward the center of the machine so that as the stalk passes through the same it will be thrown over and will fall by its own weight. By arranging the fingers 40 in alternate relation the stalk on one side will be tabled before the stalk on the other, thus making the stalks fall one upon the other. As the finger 40 rides onto the finger 46 its lug 41 will ride off the rear end of the flange 42 and said finger will be swung inward as is obvious. The spring 51 will return the hub to its normal position.

What I claim, is:

1. In a broom corn tabling machine, the combination of a wheel supported frame, a pair of gathering members mounted on the frame, bending members carried by the frame, and swinging members above the bending members and arranged to swing to bend the stalks over the bending members and deliver the same in rear of the frame.

2. In a broom corn tabling machine, the combination of an upright frame, guide members carried by the frame for receiving the stalks, gathering members traveling rearwardly on each side of the frame for carrying the stalks rearwardly with relation to the guide members, bending members carried by the frame, and swinging members mounted on the frame in coöperating with the gathering members for bending the stalks on the bending members and delivering the same at the rear of the frame.

3. In a broom corn tabling machine, the combination of an upright frame, ground wheels supporting said frame, endless chains mounted on the frame and having gathering fingers, means for driving the chains, means for projecting the fingers of the chains for gathering the stalks, bending members mounted on the frame, and swinging members coöperating with the fingers for bending the stalks and delivering the same in rear of the machine.

4. In a broom corn tabling machine, the combination of an upright frame, ground wheels supporting said frame, endless chains mounted on the frame, gathering fingers pivoted on the chains, means for driving the chains, gathering members mounted on the frame and forming a guideway, means for projecting the fingers into the guideway for engaging stalks, a bending element carried by the frame, and bending members mounted on the frame coöperating with the fingers for bending the stalks and delivering the same in rear of the machine.

5. In a broom corn tabling machine, the combination with a supporting frame mounted for transit, of stalk gathering means mounted on the frame, a bending member mounted on the frame, and a swinging member suspended from the frame and having projections coöperating with the gathering means for bending the stalks over the bending member and delivering the same in rear of the machine.

6. A stalk bending and swinging structure for broom corn tabling machines including, an upright support, a swinging member mounted on the support, projections carried by the member for engaging and swinging the stalks, and resilient means for returning the rotating member to its normal position when the stalks are delivered.

7. In a broom corn tabling machine, the combination of an upright frame, ground wheels supporting the frame, endless chains mounted on the frame, driving mechanism between the ground wheels and the endless chains, pivoted fingers mounted on the endless chains, a stalk gathering guideway carried at one side of the frame, means mounted on the frame for swinging the fingers outwardly into the guideway, a bending member carried by the frame, a vertical support carried by the frame, a second bending member carried by the support and co-acting with the first bending member, a stalk swinging member mounted on the support and having projections for engaging the stalks and bending the latter over the bending members, and guide arms mounted at the rear end of the guideway for directing the stalks which have been bent.

In testimony whereof I affix my signature.

THEODORE K. LADD.